United States Patent
Ostad et al.

(10) Patent No.: US 9,975,567 B2
(45) Date of Patent: *May 22, 2018

(54) STROLLER WITH PROTECTIVE COVER AND OTHER ACCESSORIES

(71) Applicants: Alaleh Ostad, New York, NY (US); Ariel Ostad, New York, NY (US)

(72) Inventors: Alaleh Ostad, New York, NY (US); Ariel Ostad, New York, NY (US)

(*) Notice: Subject to any disclaimer, the term of this patent is extended or adjusted under 35 U.S.C. 154(b) by 0 days. days.

This patent is subject to a terminal disclaimer.

(21) Appl. No.: 14/622,133

(22) Filed: Feb. 13, 2015

(65) Prior Publication Data

US 2017/0129525 A1    May 11, 2017

Related U.S. Application Data

(62) Division of application No. 13/728,575, filed on Dec. 27, 2012, now Pat. No. 8,955,727, which is a division of application No. 12/500,095, filed on Jul. 9, 2009, now Pat. No. 8,360,498.

(60) Provisional application No. 61/113,425, filed on Nov. 11, 2008, provisional application No. 61/079,993, filed on Jul. 11, 2008.

(51) Int. Cl.
*B60R 7/00* (2006.01)
*B62B 9/14* (2006.01)
*B62B 9/26* (2006.01)

(52) U.S. Cl.
CPC .............. *B62B 9/147* (2013.01); *B62B 9/145* (2013.01); *B62B 9/26* (2013.01)

(58) Field of Classification Search
CPC ............ B62B 9/26; B62B 9/147; B62B 9/145

USPC ............ 224/409, 456, 461; 296/102, 107.02, 296/77.1

See application file for complete search history.

(56) References Cited

U.S. PATENT DOCUMENTS

| | | | |
|---|---|---|---|
| 1,577,298 A | | 3/1926 | Roeller |
| 2,789,863 A | * | 4/1957 | Shimabukuro ......... B62B 9/142 135/115 |
| 3,227,484 A | * | 1/1966 | Merclean ................ B62B 9/142 296/77.1 |
| 3,834,756 A | * | 9/1974 | Grell ....................... B62B 9/142 296/136.1 |
| 4,186,859 A | | 2/1980 | Frankfort et al. |
| 4,346,912 A | | 8/1982 | Habib |
| 4,533,170 A | * | 8/1985 | Banks ..................... B62B 9/142 135/88.01 |
| 4,582,355 A | * | 4/1986 | Hall ........................ B62B 9/142 296/77.1 |
| 4,641,879 A | | 2/1987 | Kassai |
| 4,830,238 A | | 5/1989 | Widinski et al. |
| 5,168,579 A | | 12/1992 | Marshall |
| 5,184,865 A | * | 2/1993 | Mohtasham ............ B62B 9/142 135/133 |
| 5,224,720 A | * | 7/1993 | Chaw ....................... B62B 7/04 280/30 |

(Continued)

*Primary Examiner* — Adam Waggenspack
*Assistant Examiner* — Lester L Vanterpool
(74) *Attorney, Agent, or Firm* — Leason Ellis LLP

(57) ABSTRACT

A protective cover that is stored in a pouch that is integrally formed as a part of an upper surface of a pivotable canopy that is attached to a frame of the stroller. The protective cover is movable between a closed position in which the cover is stored in the pouch and an open position in which the cover is disposed across the canopy and across a seat of the stroller.

12 Claims, 9 Drawing Sheets

(56) References Cited

U.S. PATENT DOCUMENTS

| | | | |
|---|---|---|---|
| 5,417,353 A | 5/1995 | Stall | |
| 5,464,183 A | 11/1995 | McConnell et al. | |
| 5,542,732 A * | 8/1996 | Pollman | B62B 9/142 296/77.1 |
| 5,645,204 A | 7/1997 | Struzer | |
| 5,704,527 A | 1/1998 | Struzer | |
| 5,829,656 A | 11/1998 | Reitz et al. | |
| 5,975,558 A * | 11/1999 | Sittu | B62B 9/142 280/47.38 |
| 5,975,613 A * | 11/1999 | Sippel | B62B 9/145 296/77.1 |
| 6,012,756 A * | 1/2000 | Clark-Dickson | B62B 9/142 296/107.02 |
| 6,068,322 A * | 5/2000 | Kuester | B62B 9/142 296/97.21 |
| 6,152,340 A * | 11/2000 | Chen | B62B 9/26 224/409 |
| 6,217,099 B1 * | 4/2001 | McKinney | B62B 9/142 160/89 |
| 6,330,898 B1 * | 12/2001 | Chang | B62B 9/145 160/24 |
| 6,402,225 B1 * | 6/2002 | Hsia | B62B 9/14 296/107.02 |
| 7,213,878 B2 * | 5/2007 | Delapaz | B62B 9/142 297/184.1 |
| D602,407 S * | 10/2009 | Sanderson | D12/133 |
| 7,891,732 B2 * | 2/2011 | Hei | A47C 7/66 297/184.13 |
| 8,353,432 B2 | 1/2013 | Liu | |
| 8,413,863 B2 | 4/2013 | Bergman et al. | |
| 2003/0193221 A1 * | 10/2003 | Hoey-Slocombe | A47G 9/068 297/184.13 |
| 2004/0206868 A1 | 10/2004 | Kaufman | |
| 2005/0168006 A1 * | 8/2005 | Darland | B62B 9/14 296/97.21 |
| 2007/0251557 A1 * | 11/2007 | Carter | A45B 11/00 135/25.4 |

* cited by examiner

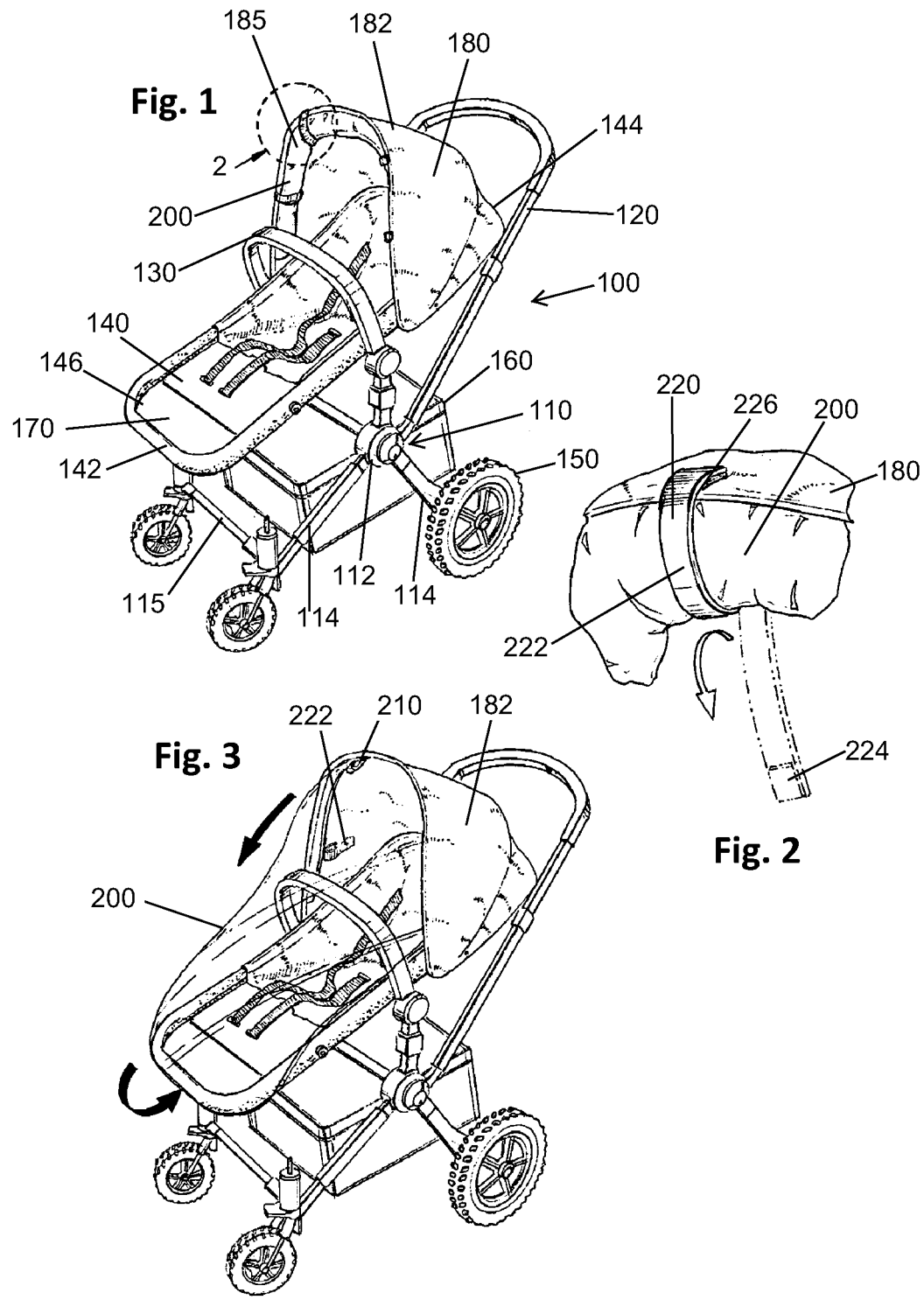

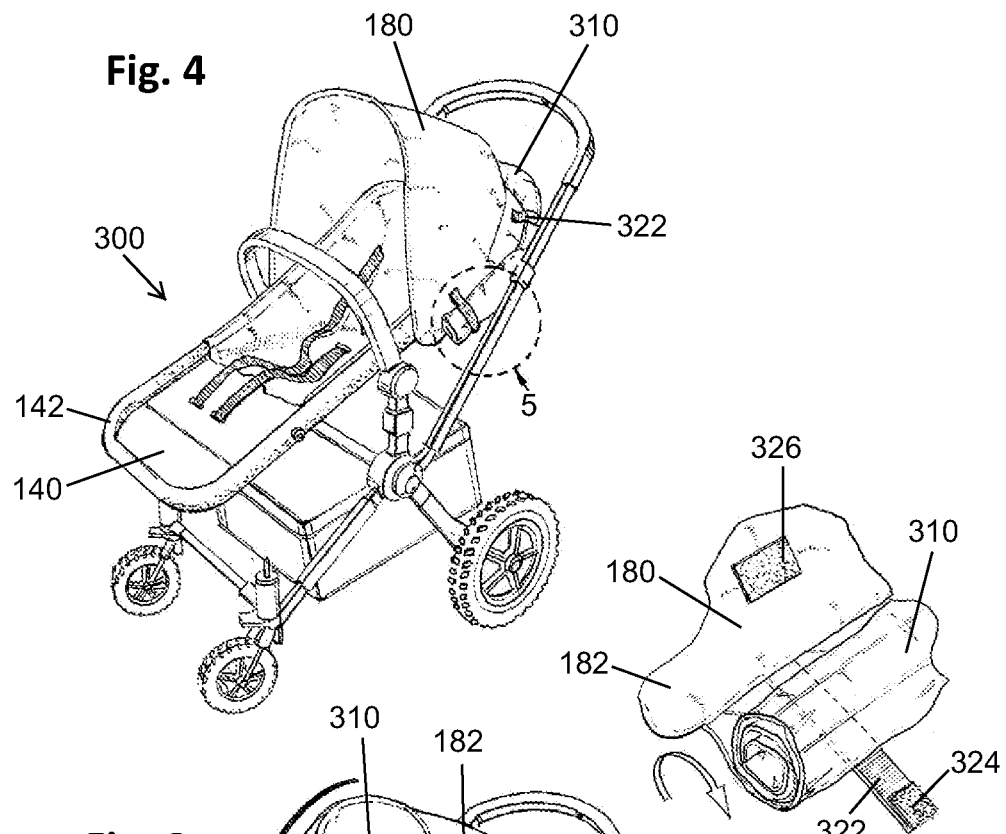
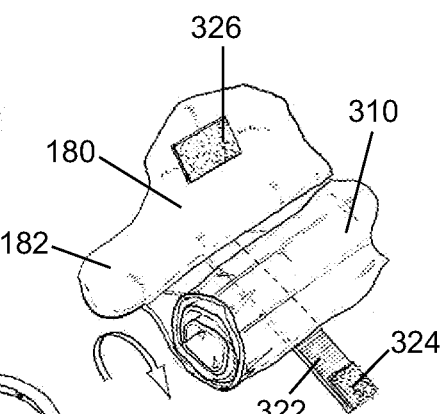
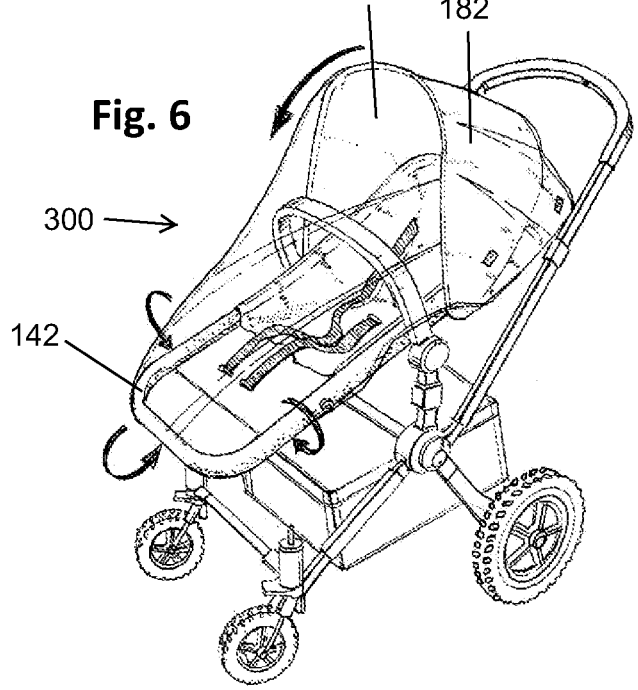

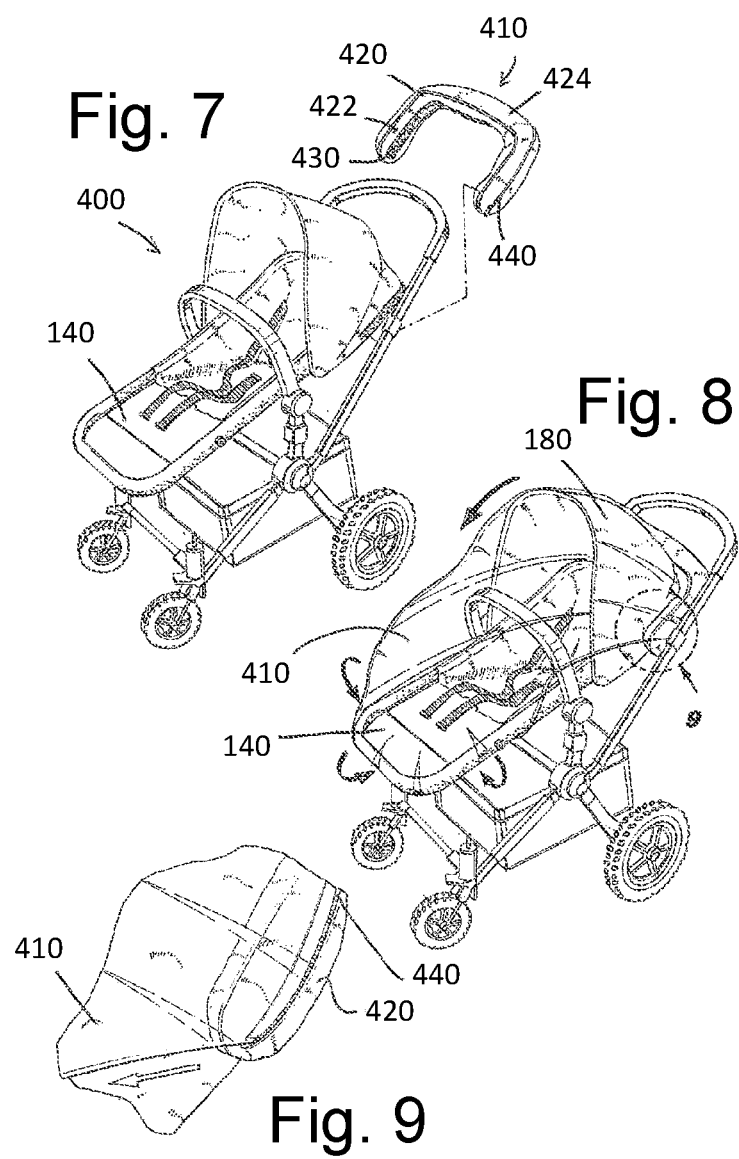

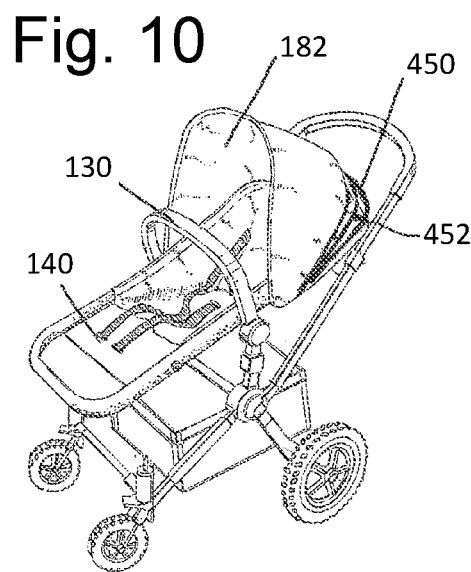

Fig. 14
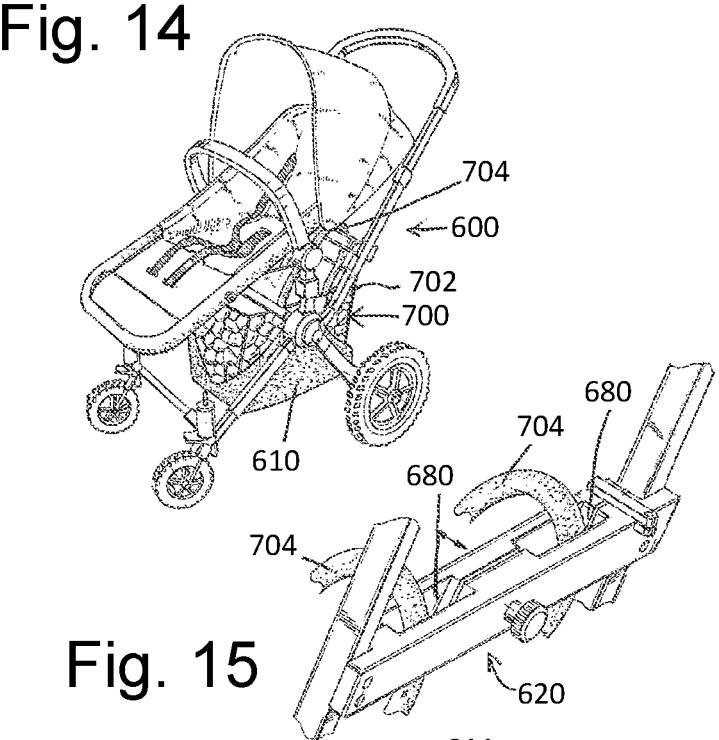
Fig. 15
Fig. 16
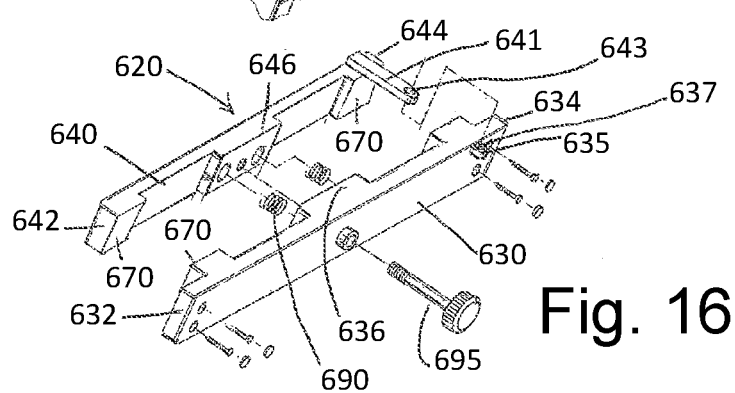

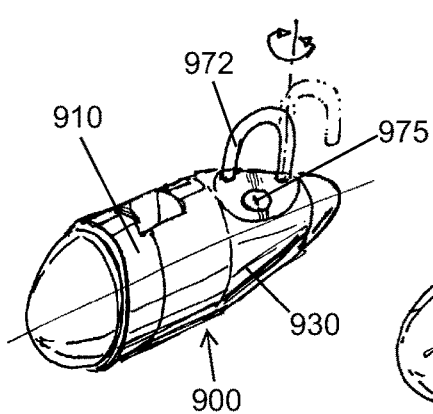
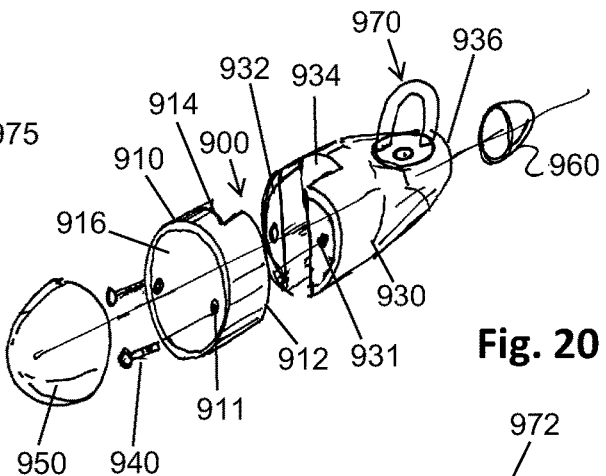
Fig. 19
Fig. 20
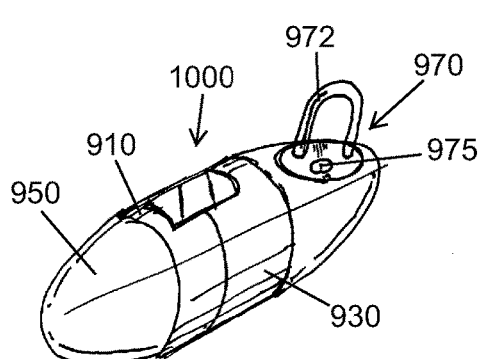
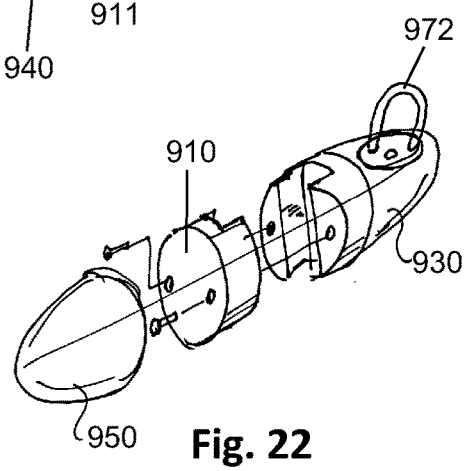
Fig. 21
Fig. 22
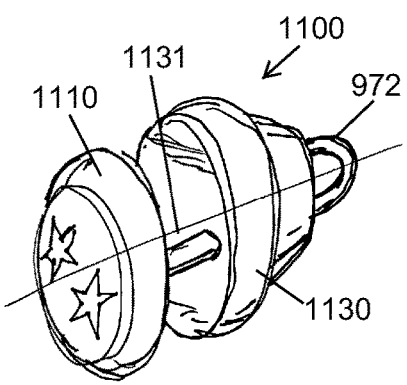
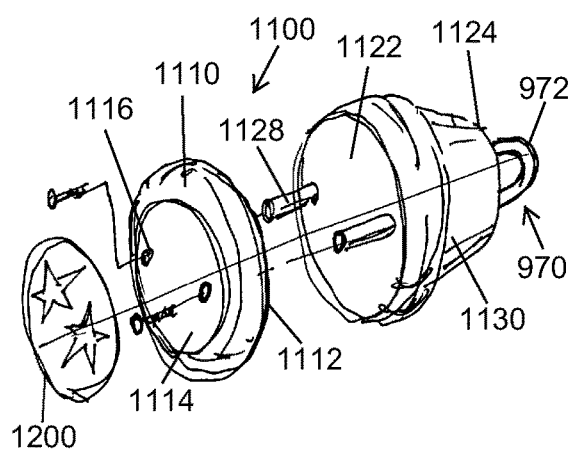
Fig. 23
Fig. 24

STROLLER WITH PROTECTIVE COVER AND OTHER ACCESSORIES

CROSS REFERENCE TO RELATED APPLICATION

The present application is a divisional of U.S. patent application Ser. No. 13/728,575, filed Dec. 27, 2012, now U.S. Pat. No. 8,955,727, issued Feb. 17, 2015, which is a divisional of U.S. patent application Ser. No. 12/500,095, filed Jul. 9, 2009, now U.S. Pat. No. 8,360,498, issued Jan. 29, 2013, which claims the benefit of U.S. patent application Nos. 61/079,993, filed Jul. 11, 2008 and 61/113,425, filed Nov. 11, 2008, each of which is hereby incorporated by reference in their entirety.

TECHNICAL FIELD

The present invention relates in general to strollers and in particular, relates to a stroller that has a cover that provides protection against sun, rain, wind and insects and also includes other accessories, such as an accessory that permits a removable bag to be securely held along a convenient location of the frame of the stroller.

BACKGROUND

Babies and small children, as well as the caretaker, enjoy being outdoors and going for outings in strollers. During an outing, the weather and the child's needs can change quickly. While children typically like to see as much around them as possible while sitting in the stroller and therefore like to be uncovered as much as possible while riding in the stroller, provisions have to be made for when the weather turns unexpectedly worse. Unlike vehicles where the occupants are comfortably seated irrespective of the weather conditions outside, an occupant of a stroller is not as lucky. The child is therefore totally dependent upon the caretaker for covering the child from rain or other elements, such as sleet or even snow.

Pushing a stroller requires two hands and therefore, when it is raining, it is very difficult for the caretaker to both push the stroller and hold an umbrella at such an angle that the child is covered from the rain. Once a child gets wet, the child becomes irritable and very difficult to manage.

Since it is not practical to both push the stroller and hold an umbrella, transparent plastic rain covers for strollers are known. These types of rain covers are typically supported by the same rigid framework of the stroller. Unfortunately, the rain covers are separate items that need to be removed from their stored locations, typically under the stroller, and then they are unrolled and attached to the frame at several locations. This can be a very cumbersome and difficult process, especially for a single caretaker. First, the protective covers when unrolled are bulky and when trying to attach one end of the cover, the opposite end of the cover is free and unattached and therefore, can blow in the wind, thereby making it all the more difficult to attach the cover to the stroller. For example, it can become very frustrating for the caretaker when one end that is attached becomes detached while trying to attach the other end and meanwhile, both child and caretaker are getting wet.

Even the high end strollers that are currently on the market have relatively basic rain covers that are detachable from the stroller when not in use and require a considerable amount of space to store them. As a result, many caretakers do not bring along the protective shield (cover) that is to be taken out and placed on the stroller, when needed, for the simple reason that the existing protective shields are very bulky and difficult to handle and furthermore, they must be stored underneath the stroller, which is undesirable. In days where changeable weather is possible but not likely, the caretaker is more apt to forego bringing the protective shield since it will occupy a substantial amount of the storage space underneath the child's seat. This is not desirable since it prevents or severely limits the amount of other more necessary items, such as a change of clothes, food, etc., that can be taken along in the stroller. Moreover, storing the protective shield (or an umbrella) can impede normal folding of the stroller unless all large articles are removed.

In addition, another deficiency of current stroller design is that the strollers have limited storage capabilities and the storage members themselves are very generic and standard looking. For example, the stroller typically has a storage bin underneath the stroller's seat. The storage bin can be a reinforced flexible piece of plastic on which different items can be placed and stowed. The storage area can also include netting or the like for holding different items. Since this area is fairly limited in space, most caretakers also carry a bag to store other items, such as diapers, cloths, water, food, etc. This extra bag is often just simply placed on and around the handle bars of the stroller so that it hangs therefrom or wedged into the storage bin below. Unfortunately, the bag can slide at times and worse, can easily be removed by a thief or the like if left unattended. Meanwhile, any articles stowed in the storage area have to be removed to permit folding of the stroller. In addition, many women wish to continue to use their expensive, designer hand bags, etc. when they are using the strollers.

As strollers become more and more fashionable, there is a need for stroller accessories that permit the user to maintain a high level of fashion and in particular, there is a need for a stroller that allows a woman to securely support a designer bag while using the stroller.

SUMMARY

In one aspect, the present invention is directed to a protective cover that is stored in a closed position in a pouch that is detachably secured to a stroller that in an open position extends across a canopy of the stroller and across a seat of the stroller.

In another aspect, the present invention includes a protective cover that is stored in a pouch that is integrally formed as a part of an upper surface of a pivotable canopy that is attached to a frame of the stroller. The protective cover is movable between a closed position in which the cover is stored in the pouch and an open position in which the cover is disposed across the canopy and across a seat of the stroller.

In another aspect, an accessory for securely holding a bag along a stroller includes a first part that is adjustably securable to a portion of the stroller; and a locking mechanism that is movable between an open position in which a handle of the bag can be received and a closed position in which a portion of the bag is captured by the locking mechanism resulting in the bag being securely affixed to the stroller.

Preferably, such an accessory is provided in combination with a stroller that has been constructed so as to define a space below the child seat, in lieu of a conventional basket, in which a bag secured to the accessory can be supported.

These and other aspects and features of the invention can be appreciated from the accompanying drawing figures and detailed description of certain embodiments.

BRIEF DESCRIPTION OF DRAWING FIGURES

FIG. 1 is a top, front and side perspective view of a stroller according to a first embodiment of the present invention with a protective cover in a rolled up, stored position;

FIG. 2 is a close-up of a portion of a protective cover that is part of the stroller of FIG. 1;

FIG. 3 is a top, front and side perspective view of the stroller of FIG. 1 in an unrolled position attached to the frame of the stroller;

FIG. 4 is a top, front and side perspective view of a stroller according to a second embodiment of the present invention with a protective cover in a rolled up, stored position;

FIG. 5 is a close-up of a portion of a protective cover that is part of the stroller of FIG. 4 being unrolled;

FIG. 6 is a top, front and side perspective view of the stroller of FIG. 4 in an unrolled position attached to the frame of the stroller;

FIG. 7 is a top, front and side perspective view of a stroller according to a third embodiment of the present invention with a detachable protective cover, shown exploded from the stroller, in a rolled up, stored position;

FIG. 8 is a top, front and side perspective view of the stroller of FIG. 7 with the protective cover in an unrolled position attached to the frame of the stroller;

FIG. 9 is a close-up of a portion of the protective cover being unrolled from a protective pouch;

FIG. 10 is a top, front and side perspective view of a stroller according to a fourth embodiment of the present invention with a protective cover in a stored position;

FIG. 14 is a top, front and side perspective view of a stroller according to a sixth embodiment of the present invention with an accessory for securely holding a bag or the like;

FIG. 15 is a close-up partial perspective view of the accessory in a locked position;

FIG. 16 is an exploded perspective view of the accessory;

FIG. 19 is a perspective view of a locking mechanism according to a first embodiment for securely holding a bag;

FIG. 20 is an exploded perspective view of the parts of the locking mechanism of FIG. 19;

FIG. 21 is a perspective view of a locking mechanism according to a second embodiment for securely holding a bag;

FIG. 22 is an exploded perspective view of the parts of the locking mechanism of FIG. 21;

FIG. 23 is a perspective view of a locking mechanism according to a third embodiment for securely holding a bag; and FIG. 24 is an exploded perspective view of the parts of the locking mechanism of FIG. 23.

DETAILED DESCRIPTION OF CERTAIN EMBODIMENTS

Figure 10A:
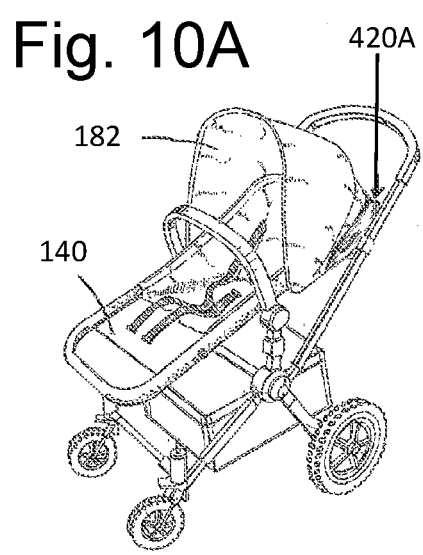
FIG. 10A is a top, front and side perspective view of a stroller that is a variation of the embodiment of FIG. 10 with a protective cover in a stored position.

FIGS. 1-3 illustrate a stroller 100 according to a first embodiment. The stroller 100 includes a chassis 110 that includes a height-adjustable handlebar 120 and a pivotable adjustable cross bar or carry handle 130, as well as an adjustable seat 140 and wheels 150. The frame 110 includes a pair of opposing frame bearers 112 from which a number of frame elements extend. For example, a bottom end of each leg of the handlebar 120 is attached to a respective frame bearer 112 and the wheels 150 are connected to the frame bearer 112 via support members 114. The seat 140 attaches to the two frame bearers 112 and includes the adjustable cross bar 130. The seat 140 is therefore positioned between the legs of the handle bar 120 and is adjustable therebetween. A conventional underseat bag or storage container 160 is shown and can be attached to cross members 115 that extend between the support members 114.

The seat 140 is adjustable relative to the chassis 110 and includes a seat frame 142 to which a fabric or other material is secured to create a seating area to receive and hold the child. The frame 142 is attached to the frame bearers 112 by means of a pair of frame supports 143. The carry handle 130 is attached to the frame 142 of the seat 140. Once the frame 142 is attached to the chassis 110, the seat fabric 170 is attached to the seat frame 142. The seat fabric 170 defines the surface on which the child sits and is attached to the frame 142 using conventional fasteners. The seat 140 has a first end 144 at which the child's head is placed and an opposite second end 146 at which the child's feet are placed. In particular, the seat fabric 170 is fitted with back pad supports, foot support and a seat pad.

The stroller 100 also includes an adjustable sun canopy 180 that is attached to the seat 140. The sun canopy 180 includes a fabric canopy 182 that is attached (fitted) at one end around the first end 144 of the seat frame 142. After fitting one end of the canopy 182, clamps or other coupling members of the canopy 180 are detachably coupled to the frame 142 of the seat 140. The front of the canopy 180 is thus defined by a frame member 185 that is typically U-shaped and is pivotable relative to the seat frame 140 to allow the sun canopy to be opened or closed. FIG. 1 shows the sun canopy 180 in the opened position.

It will be appreciated that the seat 140 also includes conventional accessories, including safety seat belts, and the like. In addition, the underseat bag 160 illustrated in FIG. 1 is conventional and is attached to the frame of the stroller 100.

In accordance with the present invention, a protective cover (e.g., rain cover) 200 is provided and is configured to provide a number of advantages over conventional protective covers that are stored separate from the seat and typically have to be stuffed in the underseat bag 160 or left at home as described above. The protective cover 200 is formed as an integral part of the canopy 180 and in particular, the protective cover 200 is disposed and stored along an underside (inner surface) of the sun canopy 180 optionally in a manner that provides a clean look to the stroller, as discussed further below. One edge 210 (rear edge) of the protective cover 200 is attached to the canopy 180 and in particular, the edge 210 can be attached to the fabric canopy 182 at a location near the frame member 185. The cover 200 is thus attached to the canopy 182 along a U-shaped seam. The protective cover 200 is a rain proof material, such as a plastic material or an engineered material, such as GORE-TEX®, that is shaped to be fitted around and to the seat frame 142. The protective cover 200 is rolled up in its stored position as shown in FIG. 1 along the inner surface of the canopy 182. A plurality of fastening members 220 is used to hold the cover 200 in its fully retracted, stored position. The fastening members 220 can be any number of different types of fasteners, including but not limited to hook and loop type fasteners, button or snap type fasteners, etc. In the illustrated embodiment, the fastening members 220 are in the form of a plurality of strips 222 that are securely attached to the inner surface of the sun canopy fabric 182 at a location spaced inward from the leading (forward) edge thereof. An opposite free end of the fastening members 220 includes a pad or section of a hook and loop type material 224 that mates with complementary hook and loop type material 226 that is positioned along the outer surface of the canopy fabric 182 near the forward edge thereof. In preferred arrangements, the cover, when in its fully retracted, stored position, is concealed from view behind a flap or within a compartment housed in the canopy 182 or frame 142.

As shown in FIG. 4, in the fully retracted position, the strips 222 extend across the rolled up cover 200 and fold over the forward edge of the canopy 182 such that the hook and loop materials 224, 226 are intimately engaged with one another, thereby holding the cover 200 in its folded position. To unfold the cover 200, the free ends of strips 222 are detached from the canopy fabric 182 and the cover 200 is freed and unrolled. Since the rear edge of the protective cover 200 is integrally attached to the canopy fabric 182, the cover 200 is more easily fitted and secured to the seat frame 142 by simply pulling the cover 200 forward and then securing its sides and forward edge to the seat frame 142. Portions of the cover 200, including the sides and forward edge, can include cinching elements, such as elastic segments, that hold the cover 200 in place along the seat frame 142.

Since the protective cover 200 is already attached to the canopy fabric 142, the caretaker does not, at the onset of inclement weather, have to stop and locate the cover underneath the stroller and then unroll into a large, unwieldy cover that then requires attachment to the seat frame. Instead, the process is much easier since the cover 200 simply needs to be unfolded by detaching the fastening members 220 or otherwise exposing a concealed cover 200. The cover 200 is then pulled forward to locate its free end near the end 146 of the seat frame 142. The cover 200 is then secured to the seat frame 142 using fastening members, such as hook and loop strips, and can be aided by the use of cinching elements that allow the sides and free end of the cover 200 to be stretched to fit around the seat frame 142 but as soon as the force is removed, the cinching elements return to their normal coiled position, thereby providing a tight fit between the cover 200 and seat frame 142. The cinching elements (elastic members) are formed as part of the cover 200 and can be located along the peripheral edges of the cover 200.

Since the cover 200 is contained along the inner surface of the fabric canopy 182 in this embodiment, it is for the most part hidden from view. In any event, it can be designed to blend in with the canopy cover 180, as noted above.

FIGS. 4-6 show a stroller 300 that is similar to stroller 100 and therefore, like elements are numbered alike with the exception that the stroller 300 includes a protective cover 310. In this embodiment, the protective cover 310 is located at a rear portion of the sun canopy 180 and thus, when it is unfolded, the protective cover 310 folds over the canopy 182 and is attached along the sides and front of the seat frame 142. As with the first embodiment, one edge (rear edge) 312 of the cover 310 is attached to the canopy fabric 182. The protective cover 310 is rolled up in its stored position as shown in FIG. 4 along the outer rear surface of the canopy 182 proximate to the frame 142. A plurality of fastening members 320 is used to hold the cover 310 in its fully retraced, stored position. The fastening members 320 can be any number of different types of fasteners, including but not limited to hook and loop type fasteners, button or snap type fasteners, etc. In the illustrated embodiment, the fastening members 320 are in the form of a plurality of strips 322 that can be securely attached to an underside of the sun canopy fabric 182 at a location along the rear edge thereof. An opposite free end of the fastening members 320 includes a hook and loop type material 324 that mates with complementary hook and loop type material 326 that is positioned along the outer surface (top surface) of the canopy fabric 182 near the rear edge thereof. Alternatively, the retracted cover 310 can be concealed from view behind a flap or within a compartment housed in the canopy 182 or frame 142, as noted above.

As shown in FIG. 1, in the fully retracted position, the strips 322 extend up and across the rolled up cover 310 and fold over the rear edge of the canopy 182 such that the hook and loop materials 324, 326 are intimately engaged with one another, thereby holding the cover 310 in its folded position. To unfold the cover 310, the free ends of strips 322 are detached from the canopy fabric 182 and the cover 310 is freed and unrolled. Since the rear edge of the protective cover 310 is integrally attached to the canopy fabric 182, the cover 310 is more easily fitted and secured to the seat frame 142 by simply pulling the cover 310 forward and then securing the sides and front of the cover to the seat frame 142. Once again, cinching elements can be provided to assist in securing the cover 310 to the seat frame 142 in a tight manner.

Now referring to FIGS. 7-9 in which a stroller 400 is shown. In this embodiment, a detachable protective cover 410 is provided for attachment to the stroller 400. The cover 410 includes a pouch-like housing 420 that contains the cover 410 and allows the cover 410 to be selectively retracted therefrom and be contained in a clean, unobtrusive housing when not in its open, operative position. For example, the pouch-like housing 420 is an elongated structure that contains the cover 410 in its folded condition. The housing 420 has an inner surface 422 that faces the fabric canopy 182 and an opposite outer surface 424 that faces away. The inner surface 422 includes a means for securely attaching the pouch-like housing 420 to the outer surface of the canopy 182 and in particular, the inner surface 422 can include a fastener 430. In the illustrated embodiment, the fastener 430 is in the form of a strip of hook and loop type material; however, other fasteners, such as a snap fastener, etc., can be used. The outer surface of the canopy 182 proximate the rear edge thereof includes a complementary fastener 440 that mates with the fastener 430 to securely, yet detachably, attach the cover 410 to the canopy 182. For example, the fastener 440 can be in the form of a hook and loop type material (as shown) or a complementary snap fastener.

The outer surface 424 of the housing 420 includes an opening 440 through which the protective cover 410 can selectively pass either when unrolling the cover 410 to its fully extended position or when rolling the cover 410 up to it fully retracted position. For example, the opening 440 can be in the form of a slit that is closeable with a zipper or the like. In this instance, when the user wants to extend the cover 410, the user unzips the pouch 420 and then retracts the cover 410 by pulling the free edge thereof. One end or edge (rear edge) of the cover 410 is securely attached to the pouch 420 and therefore, remains secured to the rear portion of the canopy 182 when the cover 182 is fully extended. Instead of using a zipper, the opening in the pouch can be closed using a snap fastener or other type of fastener including hook and loop type fasteners, etc.

In the event that the user wishes to not use the cover 410, the entire pouch-like housing 420, including the cover 410 contained therein, can be completely removed from the stroller by simply detaching the pouch, though detachability is an optional feature.

It will also be appreciated that as shown in FIG. 10, the pouch-like structure can actually be an integral part of the rear portion of the sun canopy 182. In this embodiment, the pouch 450 is part of the canopy 182 and can be accessed through an opening (slit) 452 that is formed along the canopy 182 (e.g., in a U-shape). A fastener, such as a zipper, selectively closes the opening 452 and permits convenient storage of the cover therein. To retract the cover, the user simply unzips or otherwise opens the pouch 450 and then grasps the free end of the cover and then pulls it out and over the canopy 182. The cover is then attached the seat frame in the same manner described above.

In FIG. 10A, the pouch-like structure 420A is an integral part of the rear portion of the sun canopy 182 and can have a flap, zipper, hook and loop fastener or other structure that permits access to an interior of the pouch so the free end of the cover can be grasped and pulled out and over the canopy 182. The cover is then attached the seat frame in the same manner described above.

The embodiments shown in FIGS. 10 and 10A offer a clean look since the pouch is part of the canopy. The pouch can be formed in a region that does not interfere with the folding action of the canopy 182. In other words, the canopy 182 is not located along fold lines and the canopy 182 can sufficiently be folded and stored in a retracted position. The pouch can be described as being furled. This allows the pouch to fold along with the folding of the canopy 182. One edge (inner edge) of the cover 610 is therefore securely affixed to the pouch/canopy 182 and therefore, the pouch is simply opened and the free edge of the cover 410 can be pulled out of the pouch and unfolded to allow attachment to the seat frame. The cover 410 can include cinch elements to assist in securing the cover 410 as described above. The location of the pouch thus permits the pouch to fold between folded segments of the canopy 182 as it folds.

Figures 11, 12, 13:
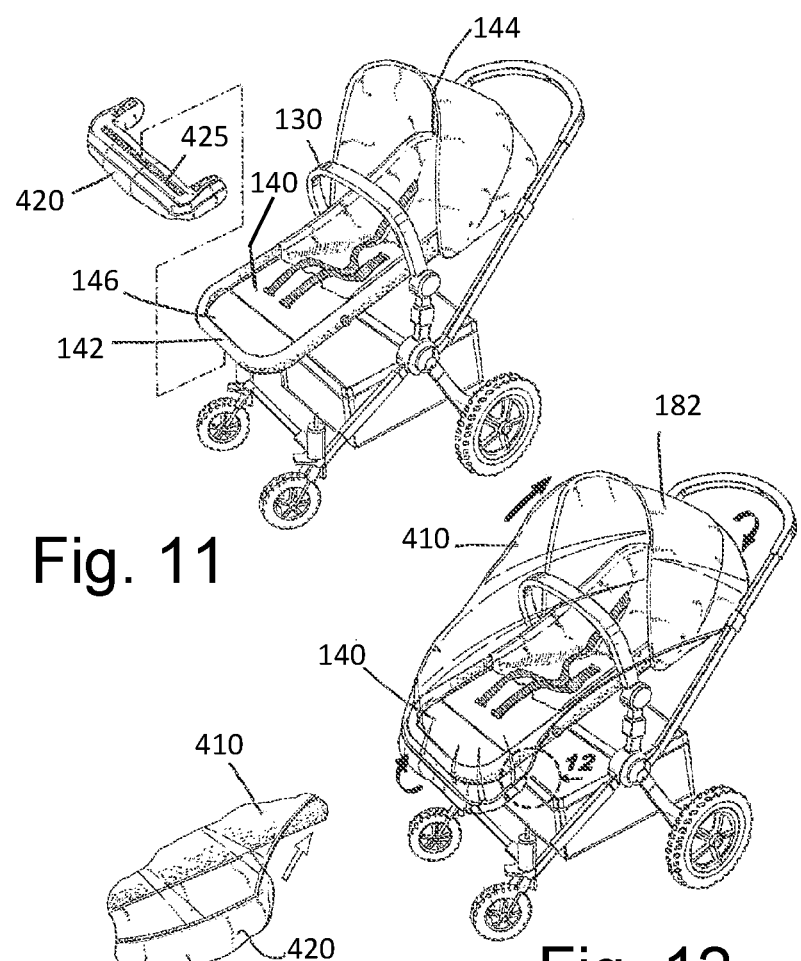
FIG. 11 is a top, front and side perspective view of a stroller according to a fifth embodiment of the present invention with a detachable protective cover, shown exploded from the stroller, in a rolled up, stored position.
FIG. 12 is a top, front and side perspective view of the stroller of FIG. 11 with the protective cover in an unrolled position attached to the frame of the stroller.
FIG. 13 is a close-up of a portion of the protective cover being unrolled from a protective pouch.

FIGS. 11-13 show stroller 400 with the detachable protective cover 410 being attached to a foot area (end 146) of the seat frame 142 as opposed to the head area (end 144) as shown in FIG. 7. In particular, the pouch-like housing 420 is conveniently stored underneath the seat frame 142 in a location where it is out of the way and generally not visible. The pouch 420 is attached to the underside using the techniques described above including the use of hook and loop type fasteners.

When the protective cover is needed, the pouch 420 is simply opened and the cover 410 is retracted therefrom and in this case, the cover is pulled rearward from the feet of the child towards its head and is secured along and to the rear edge of the canopy 182. The cover 410 thus covers the canopy 182 and once again, cinching elements can be used along the sides and rear edge of the cover 410 to provide a secure fit between the cover 410 and the seat frame 142. It will also be appreciated that as in FIG. 10, the pouch like structure 420 can be permanently attached to the underside of the seat fabric 170 in a location that permits the seat fabric to be securely attached to the seat frame 142 using a fastener 425 but also allows for the opening of the pouch 420 and the storage of the fully retracted cover 410.

Each of the previous embodiments discloses a protective cover that does not occupy the limited storage space of the underseat bag and further, is easier and quicker to fully retract and secure to the seat frame. This makes the entire process of attaching the protective cover much easier for the caretaker when inclement weather suddenly appears.

Now turning to FIGS. 14-16 in which another aspect of the present invention is shown. More specifically, the existing underseat bag design is inferior for a number of reasons. First, by its very nature and location, it is inconvenient since it is located below the child's seat and therefore is difficult to reach. Second, the design of the bag is very utilitarian and plain in nature. This may not appeal to many women and as described above, it is often difficult to bring along an extra bag, especially a designer hand bag or the like. Many women have amassed a collection of designer hand bags and they wish to be able to continue to use such bags even when on an outing and pushing their child in a stroller. The placement of such a bag in the underseat bin or bag is not feasible since it then takes up the room that is needed for the child's supplies.

Third, the underseat bag is not designed for easy removal and therefore, the caretaker cannot easily and quickly remove the bag. In many settings, it is desirable fort he caretaker to have the ability to easily remove the bag. For example, if the caretaker is at the airport and the stroller is to checked onto the airlines, it would be convenient for the caretaker to have to ability to simply remove the bag and bring it onto the plane. In addition, if the caretaker is doing an errand, visiting friends or dining at a café, there may be a desire to remove the bag from the stroller and keep it in their possession away from the stroller. However, during use of the stroller or when the user simply is distracted (e.g., looking at merchandise at a store), it would be desirable for the bag to be securely attached to the stroller.

Based on the foregoing, there is a need for a stroller that is specifically configured to allow the user to carry a hand bag in a secure manner (e.g., locked) yet the hand bag can easily be removed from the stroller when it is needed or desired.

FIGS. 14-16 show a stroller 600 that is similar to the ones described and therefore, like elements are numbered alike. The stroller 600 includes an underseat bin 610 that is secured to the chassis of the stroller 600. The bin 610 is of the type that traditionally comes standard with the stroller 600 and therefore, generally provides a surface or floor on which items can be stored and side walls that contain the items on the floor, yet differs from conventional constructions in that defines an open space below the child seat free of any access impediments from the rear of the stroller. In other words, between the upwardly extending handlebars 120, from the region just above the wheel center-line to around the underside of the frame 120, there is a defined cavity in which a bag 700 (e.g., a hand bag) can be mounted.

FIG. 14 shows a bag 700 that includes a body 702 that includes an interior for receiving articles and a pair of handles 704 (e.g., U-shaped handles) that are connected to the body 702 and in particular, are connected to side walls thereof. The stroller 600 includes an accessory 620 for securely holding the bag 700. As best shown in FIG. 16, the accessory 620 includes a first part 630 and a complementary second part 640. The first part 630 is in the form of an elongated bar that includes a first end 632 and an opposite second end 634 and similarly, the second part 640 is in the form of an elongated bar that includes a first end 642 and an opposite second end 644. Between the first and second ends 632, 634, the first part 630 includes a spacer (block) 636 and similarly, between the first and second ends 642, 644, the second part 640 includes a spacer (block) 646.

As shown in FIG. 16, the first part 630 is intended to be fixedly yet adjustably attached to the chassis of the stroller 600 and in this instance, the handlebar. For example, fasteners 660 (e.g., screws) can be used to attach the ends 632, 634 to the handlebar. The handlebar legs can have a series of vertical openings to receive the fasteners and therefore allow the height of the first part 630 to be adjusted.

The second part 640 is pivotally attached to first part 630 using conventional means including formed a finger or flange 641 that extends outwardly from the second end 644 of the second part 640 and includes an opening 643. The finger 641 is positioned over a tab or flange 635 of the first part 630 near its second end 634 such that the opening 643 aligns with an opening 637 formed in the tab 635. A locking pin or the like is then inserted through the openings 643, 637 to allow the second part 640 to pivot relative to the first part 630. In this manner, the second part 640 can open relative to the first part 630 by pivoting open at the second end 644 thereof. When the first part 630 is attached to the handlebar, the second part 640 opens outward toward the seat of the stroller.

Each of the first and second parts 630, 640 includes a pair of locating blocks 670 at the respective ends of the parts. When the first and second parts 630, 640 are in the closed position, the blocks 670 seat against one another and in combination with the spacer blocks 636, 646, a pair of openings 680 (FIG. 15) are formed. The openings 680 receive and capture the handles 704 of the hand bag 700. The accessory also includes a biasing member 690, such as one or more springs, that serve to bias the second part 640 relative to the first part 630. More specifically, the ends of the spring(s) 690 are attached to the spacer blocks 636, 646 and therefore, in a rest position, the second part 640 is biased toward the first part 630. In order to open and pivot the second part 640 relative to the first part 630, a force is applied that overcomes the biasing force. Once the force is removed, the second part 640 will swing back toward the first part 630. A lock mechanism 695 can be provided to further lock the two parts 630, 640 in place in the closed position. In the illustrated embodiment, the lock mechanism 695 is in the form of a knobbed fastener that is inserted through a through hole in the first part 630 and into a corresponding opening (threaded opening) in the second part 640 to lock the two together.

To use the accessory 620, the user simply open the second part 640 relative to the first part 630 by pivoting the second part 640, thereby opening up the openings 680. The handles 704 of the bag 700 are inserted into the openings 680 and then the second part 640 is pivoted to a closed position, thereby capturing the handles 704 in between the two parts 630, 640. The lock mechanism 695 can then be tightened to securely lock the bag 700 in place.

As shown in FIGS. 14-15, the hand bag 700 is securely held by the accessory 620 and the body 702 of the bag 700 can be supported by and within the standard bin 610. This arrangement also allows the hand bag 700 to be easily removed when needed by simply unlocking the accessory, thereby freeing the handles 704 of the hand bag 700.

Figure 17:
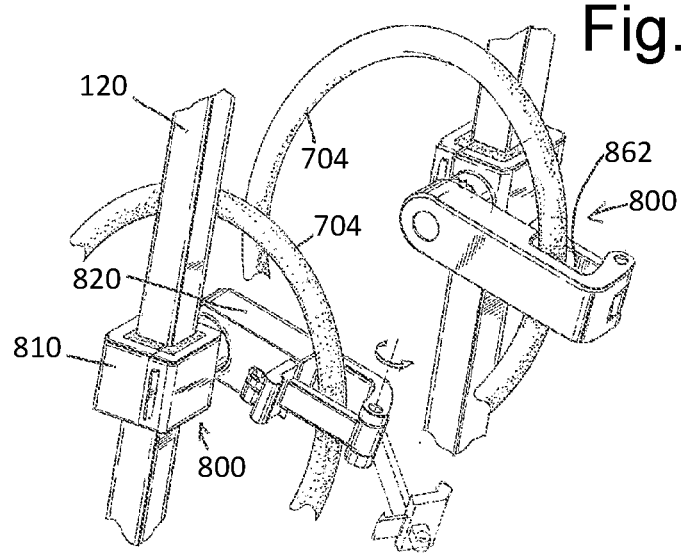
FIG. 17 is a close-up partial perspective view of another accessory for holding a bag.
Figure 18:
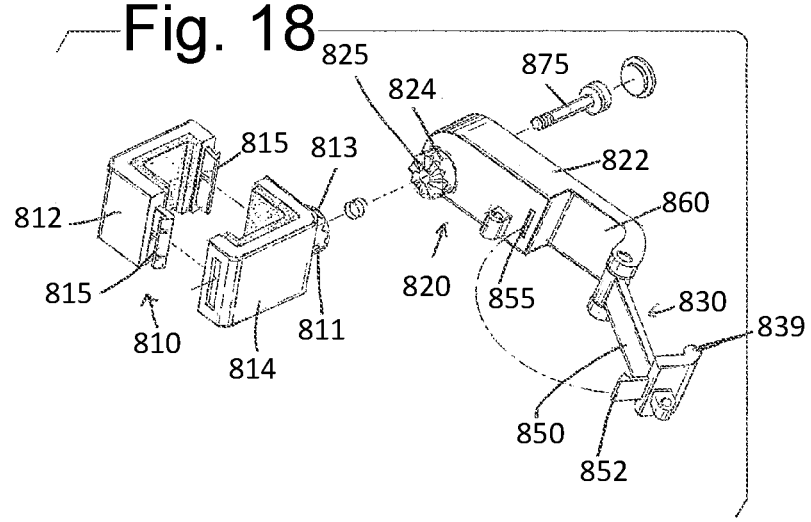
FIG. 18 is a close-up perspective view of one gripper arm of the accessory of FIG. 17.

FIGS. 17-18 illustrated another accessory 800 for securely holding a hand bag 700 on a stroller at a location besides the underseat bin 610. The accessory 800 is in the from of a pair of latch members that are secured to the opposing legs of the handlebar. The accessory 800 includes a first part 810 that is securely and fixedly attached to the handlebar and a second part 820 that is securely attached to the first part 810 and includes a latch member 830. The first part 810 includes a pair of brackets 812, 814 that mate together around one handlebar leg so that the brackets 812, 814 are securely attached to the handlebar. As shown, the brackets 812, 814 include locking members 815 that allows the two brackets 812, 814 to snap-lockingly mate with one another around the handlebar. This results in the first part 810 being securely attached to the handlebar. The first part 810 includes a boss 811 that extends outwardly therefrom and includes a first distal mesh face 813 that is defined by contoured surface (teeth).

The second part 820 includes a support arm 822 that has a boss 824 that one end and the latch member 830 at the other end. The boss 824 extends outwardly therefrom and includes a second distal mesh face 825 that is defined by a contoured surface (teeth). When the two faces 832, 825 mesh together, the support arm 822 is prevented from pivoting relative to the first part 810; however, the second part 820 can be pivotally adjusted relative to the first part 810 simply disengaging the mesh faces 813, 825 and repositioning the arm 822 relative to the first part 810.

The latch member 830 is in the form of a pivoting latch 850 that has a lock member or claw 852 at one end thereof. The support arm 822 has a recessed portion 860 that defines an opening 862 when the latch member 830 is closed. The handle 704 of the bag 700 is received within this opening 862. The latch member 830 has a lip 839 that serves as a handle to allow the user to move the latch member 830 into either the locked position or the unlocked (disengaged position). In the locked position, the claw 852 is received within a slot 855 formed along the support arm 822 proximate the recessed portion 860. To remove the hand bag 700, the claw 852 is simply disengaged from the opening 862 and the latch 850 is pivoted open, thereby allowing the handle 704 of the hand bag 700 to be removed from the opening 862. In this manner when it is desired for the hand bag 700 to be removed from the stroller, the two latch members 830 are opened and the handles 704 are removed and the bag 700 is lifted out of the stroller. Conversely, when the hand bag 700 is to be securely stored and attached to the stroller, the latch members 830 are opened and the handles 704 of the hand bag 700 are inserted into the openings 862 and the latch members 830 are closed.

The second part 820 is securely locked in place relative to the first part 810 by means of a fastener 875 or the like. As illustrated, the fastener 875 can be a threaded fastener that extends through a bore formed through the boss 824 of the support arm 822 and the boss 811 of the first part 810.

FIGS. 19 and 20 illustrate another accessory 900 for securely attaching hand bag 700 to the stroller. The accessory 900 has a dome shape and is formed of a number of parts that are assembled together. For example, the accessory 900 can include a first part 910 and a second part 930 that are configured to receive and be mated to the handle bar of the stroller. The first part 910 has an inner face 912 with a first slot 914 formed therein and an opposite outer face 916. In the illustrated embodiment, the first part 910 has a generally circular shape. Similarly, the second part 930 has an inner face 932 with a second slot 934 formed therein and an opposite outer face 936. When the parts 910, 930 are assembled, the inner faces 912, 932 face one another and the slots 914, 934 face one another and are aligned. The first and second parts 910, 930 are secured to one leg of the handle bar and in particular, the handle bar is inserted into the slots 914, 934 as the first and second parts 910, 930 are joined around the handle bar. The two parts 910, 930 are connected to one another by inserting fasteners 940 through openings 911 formed through the first part 910 and into openings 931 formed in the second part 930. For example, after mating the two parts 910, 930 to the handle bar, fasteners 940 are inserted into openings 911 along the outer surface 916 and are received into threaded openings 931 in the inner face 932 of the second part 930. In the assembled position, the aligned slots 914, 934 have a shape complementary to the shape of the handle bar to allow for the handle bar to be securely captured and held therein.

Since the outer surface 916 of the first part 910 includes openings 911 and the heads of the fasteners 940 are visible, a trim cap 950 can be provided for covering these components and providing an aesthetically pleasing look. Similarly, a trip cap 960 can be attached to an outer face 936 of the second part 930 to provide an aesthetically pleasing look. The two parts 910, 930 thus form a compression fit.

When attached to the handle bar, the two accessories 900 are oriented such that each second part 930 is located between the two legs of the handle bar and therefore the lock mechanisms of both can capture and hold the handles of the hand bag. In this manner, the hand bag is held in a secured position on the stroller.

The accessory 900 is constructed to securely hold the hand bag 700 and therefore, the second part 930 includes a lock 970. The locking mechanism 970 is similar in design to a padlock in that it includes a shackle 972 that is movable (pivot or slides in and out) relative to a body which in this case is the second part 930. In the open position, a space or gap is formed between the shackle 972 and the second part 930 to allow one handle of the hand bag to be received therebetween and in the closed position, the shackle 972 is fully engaged with the second part 930. The lock 970 also includes a locking mechanism that releases the shackle 972 when the mechanism is actuated. For example, a simple locking mechanism can be a push button system where the user simply presses a button or inserts a key into keyhole 975 to release the shackle 972. To relock the locking mechanism, the shackle 972 is simply inserted back into the second part 930 to its locked position. In this manner, the shackle 972 can be locked in place resulting in the bag being securely captured. In this locked position, the hand bag can not be removed from the stroller. The locked position is desirable when the caretaker is in an environment where the user's attention and watch over the hand bag is reduced (e.g., in a crowded location or at a department or grocery store where the caretaker needs to look away at items of shelves). However, the removal of the hand bag is simple since the caretaker only needs to unlock the locking mechanism.

In addition, the accessory is located at a position where it is easy to access the contents of the hand bag during an outing and in fact as the stroller is being pushed. This location is much more convenient than the underside of the seat where conventional bags are stored.

FIGS. 21-22 show an accessory 1000 that is similar in construction to the accessory 900 and therefore, like elements are numbered alike. The accessory 1000 has an egg-like shape and is formed of first and second parts 910, 930 and trim cap 950. The trim cap 960 is eliminated in this design. The accessory 1000 is mounted to the handle bar in the same manner as accessory 900 in that the handle bar leg is inserted into the slots 914, 934 and then fasteners 940 are used to securely attach the two parts 910, 930 together. The operation of the accessory 1000 is the same as described above with reference to accessory 900.

FIGS. 23-24 show an accessory 1100 for securely holding a hand bag on a stroller similar to the previously described accessories. The accessory 1100 is formed of a first part 1110 and an opposing second part 1130 that are coupled to one another such that the handle bar leg is captured therebetween. The first part 1110 can be a generally circular disc like structure that has an inner face 1112, an opposite outer face 1114, and a pair of spaced bores 1116 formed therethrough. The second part 1120 also has a generally circular shaped body and includes an inner face 1122, an opposite outer face 1124 and a pair of spaced pins or posts 1128 that extend outwardly from the inner face 1122. The posts 1128 are configured to be received into the bores 1116. When the first and second parts 1110, 1120 are securely attached to one another, there is a space 1131 formed between the first and second parts 1110, 1120 that receives the leg of the handle bar. In other words, the second part 1120 is positioned so that the leg of the handlebar is received between the posts 1128. The first part 1110 is then securely attached to the second part 1120 using the fasteners 940. A compression fit thus results between the first and second parts 1110, 1120 with the handle bar securely captured therebetween.

As with the other embodiments, the accessory 1100 includes a locking mechanism and in particular, the second part 1120 includes locking mechanism 970 that is similar in design to a padlock in that it includes a shackle 972 that is movable (pivot or slides in and out) relative to the second part 1120. In the open position, a space or gap is formed between the shackle 972 and the second part 1120 to allow one handle of the hand bag to be received therebetween and in the closed position, the shackle 972 is fully engaged with the second part 1120. The lock 970 also includes a locking mechanism that releases the shackle 972 when the mechanism is actuated. For example, a simple locking mechanism can be a push button system where the user simply presses button 975 to release the shackle 972. To relock the locking mechanism, the shackle 972 is simply inserted back into the second part 1120 to its locked position.

Indicia 1200 can be provided on the outer surface of the first part 1110. For example, a decal 1200 or the like can be placed on the outer surface of the first part 1110 not only to provide an attractive appearance but also to cover up the fasteners 940.

In the above embodiments, the accessories can be easily adjusted not only vertically along the handle bar or other frame member but also, the accessories can rotate about the handle bar or frame. In some cases, the accessories may need to be rotated about the frame to accommodate larger or smaller bags. In other words, the relative positions between the two accessories can be changed. The accessories may be spaced directly across from one another or they may be offset from one another or set at an angle.

It will be appreciated that the accessories that hold the hand bag are adjustable along a height of the handle bar to permit easy repositioning. For example, the accessory can include an easy latch or lever mechanism that when opened allows for the accessory to be moved along the handle bar or other frame component and then once the accessory is in the new, desired location, the latch or lever mechanism is closed, thereby securely attaching the accessory to the stroller (similar to a bike seat adjustment mechanism). The pivoting of the latch or lever causes a tightening of the part on the frame. This also allows the accessories to rotate along the handle bar or frame. In some cases, the accessories may need to be rotated about the frame to accommodate larger or smaller bags.

It will be further appreciated that the accessories can receive and secure the bag 700 by engaging a feature of the bag other than the handles 704. Thus, for example, a bag can have one or more rings, or other structure that cooperates with the accessory to be received in the accessory to secure the bag in place. By way of illustration, and not limiting of the invention, the space defined below the frame 142 can include plural accessories as previously described which are arranged and positioned or positionable to engage a bag at various places, including proximate a top end of the bag so that the so-engaged bag can be accessed by the user, and at other places including away from the top end so as to restrict movement or otherwise orient the body of the bag.

Features of one embodiment can be used in other embodiments within the scope of the present invention.

While the invention has been described in connection with certain embodiments thereof, the invention is capable of being practiced in other forms and using other materials and structures. Accordingly, the invention is defined by the recitations in the claims appended hereto and equivalents thereof.

What is claimed is:

1. A protective cover stored in a pouch for detachably coupling to a stroller having a frame, a seat and a canopy, the pouch including a first fastening element for detachably coupling to the stroller, the protective cover being movable between a closed position in which the cover is stored in the pouch and an open position in which the cover is configured for placement across the canopy and seat of the stroller, the pouch having closure means for securely holding and storing the cover in the closed position, wherein the pouch is U-shaped so as to be configured to extend around a rear surface and opposing side surfaces of the canopy of the stroller, the first fastening element being disposed along at least a substantial length of an inner surface of the pouch that is for placement against an outer face of the rear surface and opposing side surfaces of the canopy, the closure means extending along at least a substantial length of a top surface of the pouch, the closure means being disposed outwardly relative to the first fastening element so as be located further away from the canopy.

2. The protective cover of claim 1, wherein the pouch includes a middle portion and first and second leg portions coupled to the middle portion.

3. The protective cover of claim 2, further comprising a second fastening element having a first portion for directly attaching to the stroller, and a second portion adapted to detachably couple to the first fastening element of the pouch for securely attaching the pouch to the stroller.

4. The protective cover of claim 3, wherein the second fastening element is adapted to couple to the canopy of the stroller.

5. The protective cover of claim 3, wherein the first fastening element faces perpendicularly from a direction in which the first and second legs of the pouch extend from the middle portion.

6. The protective cover of claim 5, further comprising a second fastening element having a first portion for directly attaching to a foot area of the frame of the stroller, and a second portion adapted to detachably couple to the first fastening element on the top surface of the pouch.

7. The protective cover of claim 1, wherein the first fastening element is in the form of a strip of hook and loop material.

8. The protective cover of claim 6, wherein the protective cover is movable from the front of the stroller toward the back to cover the seat and canopy.

9. In combination with a stroller having a frame, a seat and a movable canopy that at least partially covers the seat, a protective cover accessory comprising:
a pouch having an opening that provides an entrance to a hollow interior, the opening of the pouch being closeable so as to close off the hollow interior, the pouch further including a first fastening element configured to detachably couple the pouch to the stroller; and
a protective cover stored in the pouch and being movable between a closed position in which the cover is stored in the pouch and an open position in which the cover is configured for placement across the canopy and seat of the stroller;
wherein the pouch is U-shaped so as to be configured to extend around a front edge and opposing side surfaces of the seat of the stroller, the first fastening element being disposed along at least a substantial length of an upper surface of the pouch that is for placement against an underside of the seat, the closure means extending along at least a substantial length of an outer surface of the pouch that is opposite an inner surface of the pouch that faces the seat, the closure means being disposed outwardly relative to the first fastening element so as be located further away from the seat.

10. The combination of claim 9, wherein one edge of the protective cover is securely fastened to an inner surface of the pouch.

11. The combination of claim 9, wherein the protective cover including cinching elements along edges of the protective cover to provide a secure fit between the protective cover and the seat.

12. The combination of claim 9, wherein the opening is closed with at least one of a zipper or a plurality of snaps.

* * * * *